(12) United States Patent
Ghosh

(10) Patent No.: US 9,921,750 B2
(45) Date of Patent: Mar. 20, 2018

(54) SOLID STATE DRIVE (SSD) MEMORY CACHE OCCUPANCY PREDICTION

(71) Applicant: Samsung Electronics Co., Ltd., Suwon-si, Gyeonggi-do (KR)

(72) Inventor: Mrinmoy Ghosh, San Jose, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 329 days.

(21) Appl. No.: 14/813,070

(22) Filed: Jul. 29, 2015

(65) Prior Publication Data

US 2016/0147446 A1    May 26, 2016

Related U.S. Application Data

(60) Provisional application No. 62/082,601, filed on Nov. 20, 2014.

(51) Int. Cl.
| | | |
|---|---|---|
| G06F 13/00 | (2006.01) | |
| G06F 3/06 | (2006.01) | |
| G06F 12/0862 | (2016.01) | |

(52) U.S. Cl.
CPC .......... G06F 3/061 (2013.01); G06F 3/0659 (2013.01); G06F 3/0688 (2013.01); G06F 12/0862 (2013.01); *G06F 2212/311* (2013.01); *G06F 2212/6026* (2013.01)

(58) Field of Classification Search
CPC .................................. G06F 3/06; G06F 12/08
See application file for complete search history.

(56) References Cited

U.S. PATENT DOCUMENTS

| | | | |
|---|---|---|---|
| 8,583,865 B1 | 11/2013 | Sade et al. | |
| 8,589,655 B2 | 11/2013 | Colgrove et al. | |
| 8,635,400 B2 | 1/2014 | Yamamoto et al. | |
| 2011/0161557 A1* | 6/2011 | Haines ................ | G06F 12/0893 711/103 |
| 2013/0042056 A1 | 2/2013 | Shats et al. | |
| 2013/0086301 A1* | 4/2013 | Cleveland ............ | G06F 3/0689 711/103 |
| 2013/0173853 A1 | 7/2013 | Ungureanu et al. | |
| 2013/0254323 A1 | 9/2013 | Bhalerao et al. | |

(Continued)

*Primary Examiner* — Charles Rones
*Assistant Examiner* — Han Doan
(74) *Attorney, Agent, or Firm* — Renaissance IP Law Group LLP

(57) ABSTRACT

Embodiments of the inventive concept include a solid state drive (SSD) shared array memory cache system including memory cache occupancy prediction. The system can include multiple SSD modules each including a non-volatile memory section, a cache, and a prediction agent generator logic section. The system can further include a host agent including an occupancy prediction logic section that can receive prediction agents from the prediction agent generator logic section of each of the SSD modules, and predict content occupancy of the cache based at least on the prediction agents. A method for predicting SSD memory cache occupancy can include processing write requests, predicting content occupancy of an SSD's cache, determining whether an address in the cache is probably logically contiguous to the logical memory address, re-directing at least one write request, and coalescing multiple write requests including the re-directed write request into a single I/O for storage on the non-volatile memory of the SSD.

15 Claims, 7 Drawing Sheets

(56) References Cited

U.S. PATENT DOCUMENTS

| | | |
|---|---|---|
| 2013/0346538 A1 | 12/2013 | Blinick et al. |
| 2014/0006698 A1 | 1/2014 | Chappell et al. |
| 2014/0013027 A1 | 1/2014 | Venkata et al. |
| 2014/0095775 A1 | 4/2014 | Talagala et al. |
| 2014/0195720 A1 | 7/2014 | Akella et al. |
| 2015/0364191 A1* | 12/2015 | Muralimanohar ..... G11C 16/26 365/163 |

* cited by examiner

US 9,921,750 B2

SOLID STATE DRIVE (SSD) MEMORY CACHE OCCUPANCY PREDICTION

RELATED APPLICATION DATA

This application claims the benefit of U.S. patent application Ser. No. 62/082,601, filed Nov. 20, 2014, which is hereby incorporated by reference.

BACKGROUND

The present inventive concepts relate to solid state drives (SSDs), and more particularly, to SSD memory cache occupancy prediction for reducing I/Os, reducing wear, and improving performance.

The number of modern devices that include SSDs is increasing at a significant pace. With the rapid expansion of Internet-enabled devices, computer server farms, mobile devices, high-speed networks, and the like, SSDs are becoming a crucial backbone storage technology that enables a broad range of innovative applications. To increase capacity and performance, some attempts have been made to group SSDs into shared arrays. But a host device or agent that interacts with a shared SSD array has limited knowledge of the state of the various SSDs.

In particular, the state of the cache within an SSD, which may be a volatile memory such as a dynamic random access memory (DRAM), is not exposed to any external device (e.g., host agent). Because of such opaqueness, current approaches for interacting with an SSD array are relatively less efficient than they otherwise could be. For example, if a first write occurs to a particular logical memory address, such first write will be directed to a first SSD. Then, if a second write occurs to the same particular logical memory address, conventional approaches may send the second write to a different SSD, and then invalidate the contents written to the first SSD. This requires multiple I/Os to the non-volatile memory of different SSDs, thereby reducing performance. Embodiments of the present inventive concept address these and other limitations in the prior art.

BRIEF SUMMARY

Embodiments of the inventive concept include a solid state drive (SSD) shared array memory cache system. The system can include a plurality of SSD modules each including a non-volatile memory section, a cache, and a prediction agent generator logic section. The system can include a host agent communicatively coupled to the plurality of SSD modules, the host agent including an occupancy prediction logic section configured to receive one or more prediction agents from the prediction agent generator logic section of each of the SSD modules, and to predict content occupancy of the cache based at least on the one or more prediction agents.

Embodiment of the inventive concept can include a computer-implemented method for predicting solid state drive (SSD) memory cache occupancy and for reducing I/Os in an SSD shared array. The method can include processing, by a host agent, write requests to a particular logical memory address. For example, the method can include processing, by the host agent, a first write request including first data content associated with a particular logical memory address. The method can include processing, by the host agent, a second write request including second data content associated with the particular logical memory address. The method can include predicting content occupancy of a cache of a particular SSD from among a plurality of shared SSDs. The method can include determining whether a location in the cache of the particular SSD is probably logically contiguous to the particular logical memory address based on the prediction.

Embodiments of the inventive concept can include a solid state drive (SSD). The SSD can include a non-volatile memory section, a cache coupled to the non-volatile memory section, and a prediction agent generator logic section coupled to the cache and configured to generate one or more prediction agents to predict content occupancy of the cache. The prediction agent generator logic section can be configured to transfer the one or more prediction agents to a host agent that is separate from the SSD. The prediction agent generator logic section can include one or more bloom filters, and can be configured to generate one or more bloom filter vectors based at least on the one or more bloom filters. The one or more bloom filter vectors can include the one or more prediction agents. The prediction agent generator logic section can periodically broadcast, among other techniques described below, the one or more bloom filter vectors including the one or more prediction agents to the host agent that is separate from the SSD.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Figure 1:
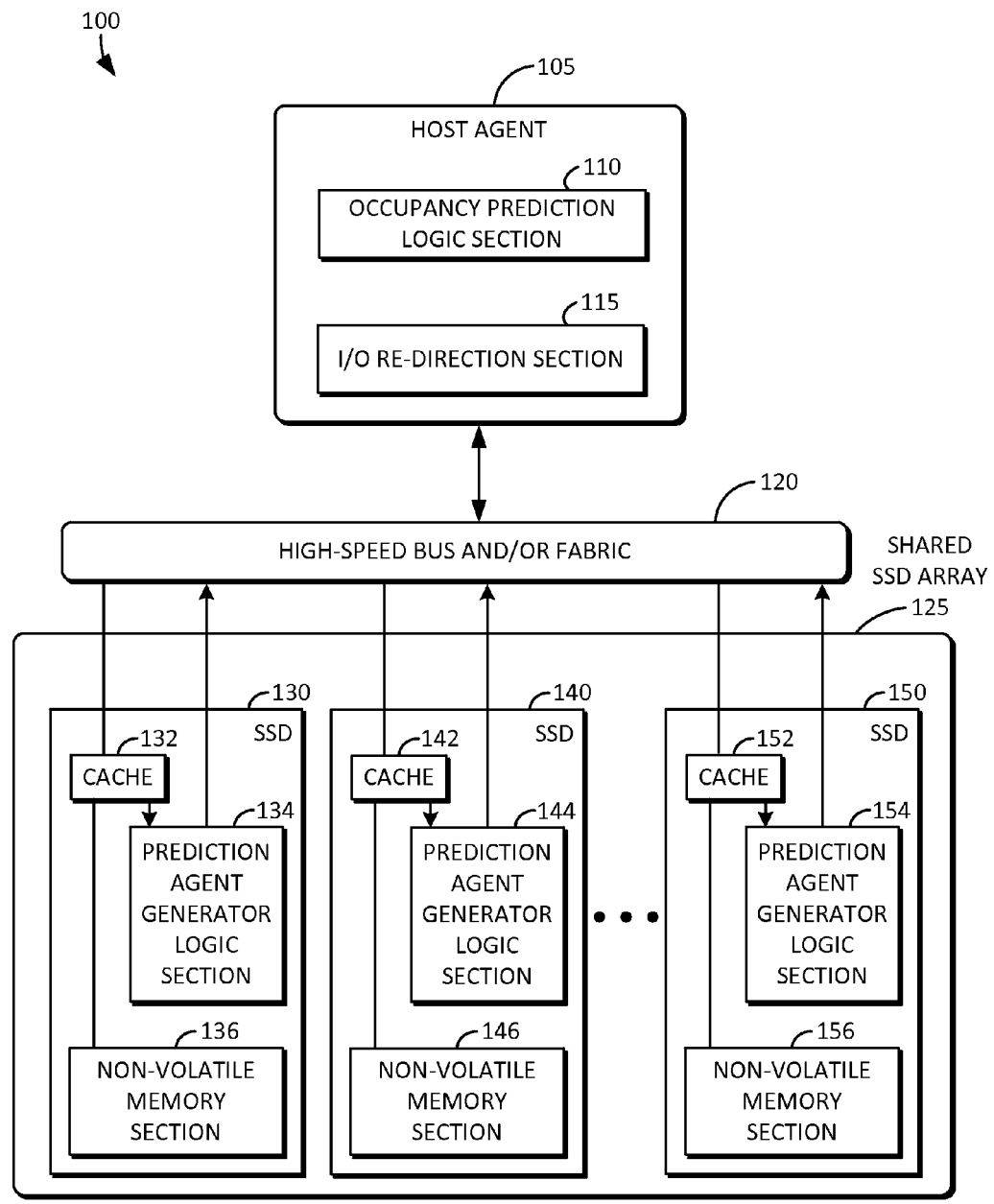
FIG. 1 is an example block diagram of an SSD shared array memory cache system including a host agent and a shared SSD array in accordance with embodiments of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first hashed key could be termed a second hashed key, and, similarly, a second hashed key could be termed a first hashed key, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept include systems, devices, and techniques for predicting contents of a cache of an SSD. Some embodiments include a mechanism for transferring information about data content within the cache to an external agent such as a host. The external agent can query the SSD for one or more prediction agents, such as bloom filter vector information, when needed, i.e., on demand. Alternatively or in addition, the SSD can periodically broadcast the one or more prediction agents so that the external agent can have information about the data content of the SSD's cache. Alternatively or in addition, instead of transferring complete bloom filter vector information, the SSD can transfer updates without transferring the entirety of the vector information, thereby reducing overhead.

The external agent can re-direct writes based on the predicted cache content. Moreover, the external agent can coalesce multiple write requests that would have otherwise been sent to different SSDs into a single I/O that is sent to a particular SSD. Such coalescing can be accomplished by re-direction of write requests to addresses that are adjacent to cached addresses, as further described in detail below. Successive writes to a cached address, and a reduction in the number of I/Os, results in an increase in performance and an overall increase in endurance of the shared SSD array.

FIG. 1 is an example block diagram of an SSD shared array memory cache system 100 including a host agent 105 and a shared SSD array 125 in accordance with embodiments of the inventive concept. The shared SSD array 125 can include multiple SSD modules (e.g., 130, 140, and 150). Each of the SSD modules can include a non-volatile memory section (e.g., 136, 146, and 156, respectively), a cache (e.g., 132, 142, and 152, respectively), and a prediction agent generator logic section (e.g., 134, 144, and 154, respectively). It will be understood that the host agent 105 need not reside on a "host" per se, but can be separate from the host, upstream of the SSD shared array 125, and/or part of the shared SSD array 125.

The host agent 105 can be communicatively coupled to the shared SSD array 125 via a high-speed bus and/or fabric 120. For example, the high-speed bus and/or fabric 120 can be a Peripheral Component Interconnect Express (PCIe) bus or fabric, an Ethernet based fabric, a universal serial bus (USB), a Fibre Channel (FC) bus or fabric, or the like. It will be understood that any suitable kind of high-speed bus and/or fabric can be used in connection with the various embodiments of the inventive concept disclosed herein. The host agent 105 can include an occupancy prediction logic section 110 and an I/O re-direction section 115. The occupancy prediction logic section 110 can receive one or more prediction agents from the various prediction agent generator logic sections (e.g., 134, 144, and 154) of each of the corresponding SSD modules (e.g., 130, 140, and 150, respectively), as further described in detail below. The occupancy prediction logic section 110 can store bloom filter vectors 305 (of FIG. 3, below) from the various SSDs of the shared SSD array 125. The occupancy prediction logic section 110 can predict content occupancy of the various caches (e.g., 132, 142, and 152, respectively) based at least on the one or more prediction agents, as also further described in detail below. The I/O re-direction section 115 can generate, forward, re-direct, and/or coalesce write requests to the shared SSD array 125, as also further described in detail below.

Figure 2:
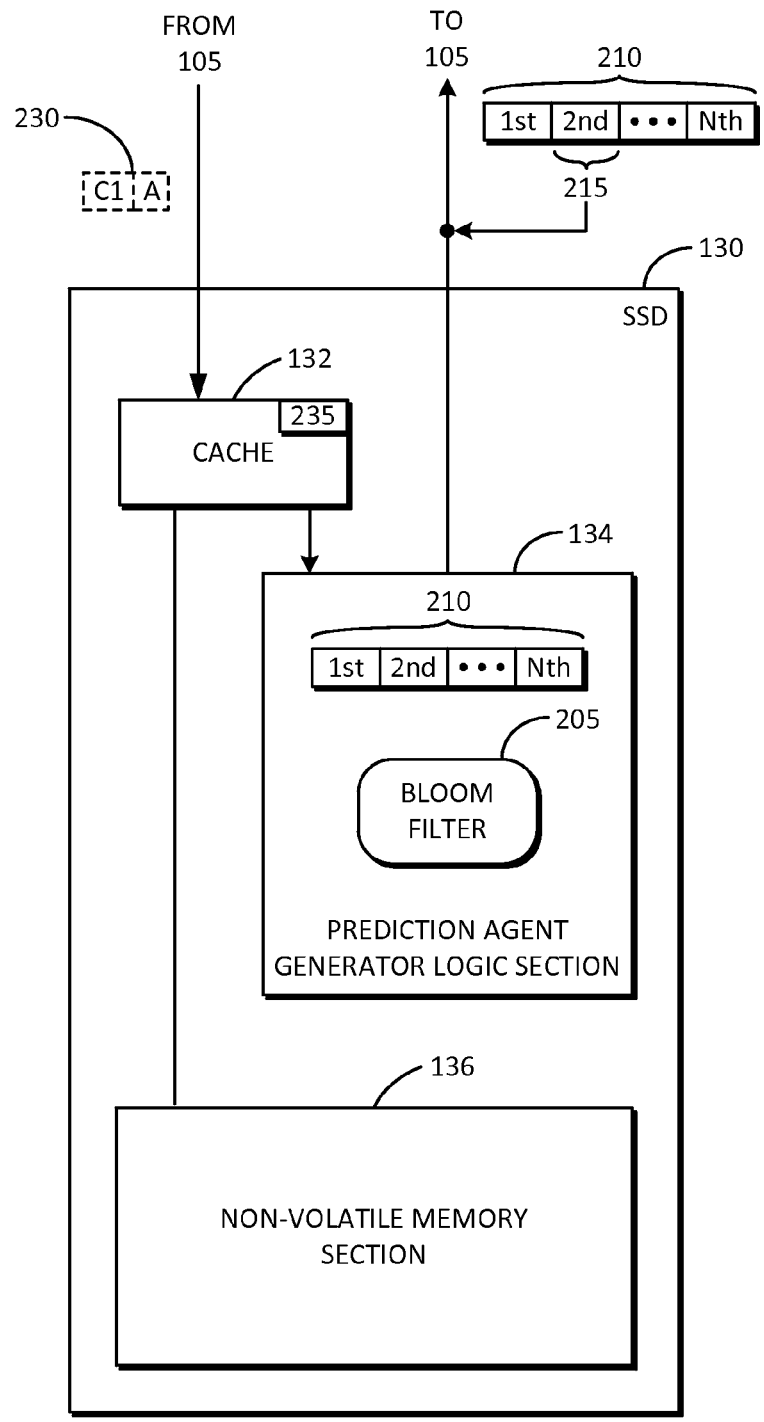
FIG. 2 is an example block diagram of an SSD from among the shared SSD array of FIG. 1 in accordance with embodiments of the inventive concept.

FIG. 2 is an example block diagram of an SSD 130 from among the SSDs of the shared SSD array 125 of FIG. 1 in accordance with embodiments of the inventive concept. The prediction agent generator logic section 134 can include one or more bloom filters 205. The prediction agent generator logic section 134 can generate one or more bloom filter vectors 210 based at least on the one or more bloom filters 205. Each of the one or more bloom filter vectors 210 can include one or more prediction agents (e.g., 1st, 2nd, through Nth prediction agents). The prediction agents can be determined based at least on one or more hash functions of the one or more bloom filters 205. The one or more prediction agents can predict the presence of an address and/or data contents in the cache. The one or more bloom filters 205 can be used to determine whether an address and/or data contents may be present in the cache. Moreover, the one or more bloom filters 205 can be used to definitively determine that a particular address and/or data contents are not present in the cache.

The prediction agent generator logic section 134 can periodically broadcast the one or more bloom filter vectors 210 including the one or more prediction agents. Alternatively or in addition, the host agent 105 can periodically query the prediction agent generator logic section 134 for the one or more bloom filter vectors 210 including the one or more prediction agents. Alternatively or in addition, the prediction agent generator logic section 134 can provide an update (e.g., 215) to the one or more bloom filter vectors 210, and to transfer the update 215 without transferring the entirety of the one or more bloom filter vectors 210. The SSD 130 can receive write requests (e.g., 230), which can include data content (e.g., 'C1') and an address (e.g., 'A'). The cache 132 of the SSD 130 can store the data content 'C1' at an arbitrary location in the cache 132, along with one or more other write requests that are logically contiguous with the address 'A,' as further described in detail below.

Figure 3:
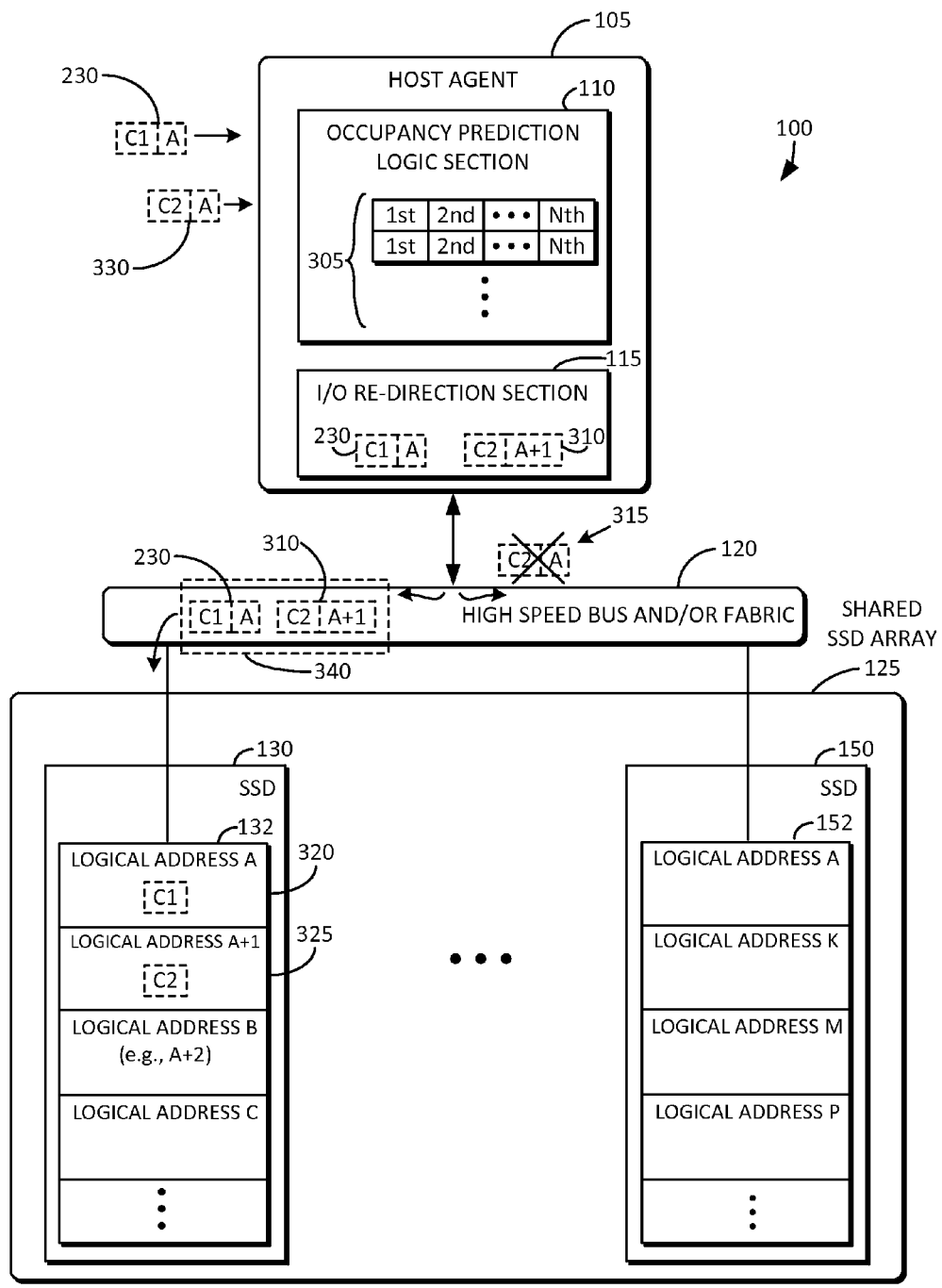
FIG. 3 is an example block diagram of the SSD shared array memory cache system of FIG. 1 including additional detailed aspects of the system in accordance with embodiments of the inventive concept.

FIG. 3 is an example block diagram of the SSD shared array memory cache system 100 of FIG. 1 including additional detailed aspects of the system 100 in accordance with embodiments of the inventive concept. The host agent 105 can process a first write request 230 including first data content 'C1' associated with a particular logical memory address 'A.' The host agent 105 can send the first write request 230 having the first data content 'C1' associated with the particular logical memory address 'A' to a particular one of the SSD modules (e.g., 130). The particular one of the SSD modules 130 can store the first data content 'C1' associated with the first write request 230 at a location 320 in the cache 132 that is determined by cache replacement logic 235 when the request 230 is inserted in the cache 132.

The occupancy prediction logic section 110 can predict the presence of an address in the cache 132 that is logically contiguous (e.g., at address A+1) with the particular logical memory address 'A.' The host agent 105 can process a write request (e.g., 330) having data content 'C2' associated with a particular logical memory address 'A.' The host agent 105 can include an I/O re-direction section 115. The I/O re-direction section 115 can re-direct the write request 330 having the data content 'C2' to the cache 132 that has a logically contiguous address in it. In other words, the I/O re-direction section 115 can change the write request 330 having the address 'A' to a re-directed write request 310 to be stored contiguous to the address 'A+1.' Put differently, instead of sending the write request 330 to the SSD 150 for storage at the logical address 'A' of the cache 152 as shown at 315, the I/O re-direction section 115 can cause the write request 330 to be re-directed to the SSD 130 for storage contiguous to the logical address 'A+1' of the cache 132.

The I/O re-direction section 115 can send the redirected write request 310 having the data content 'C2' to the particular one of the SSD modules 130. The particular one of the SSD modules 130 can store the data content 'C2' associated with the redirected write request 310 at the location 325 in the cache 132 that is logically contiguous with the location 320 in the cache 132 that is associated with the particular logical memory address 'A.'

The I/O re-direction section 115 and/or the cache (e.g., 132) can coalesce the first write request 230 and the redirected second write request 310 into a single I/O (e.g., 340), and send the single I/O 340 to the non-volatile memory 136 (of FIG. 1). Such coalescing reduces the number of I/Os between the caches of the SSDs and the respective non-volatile memories, thereby increasing the endurance of the shared SSD array 125.

Figure 4:
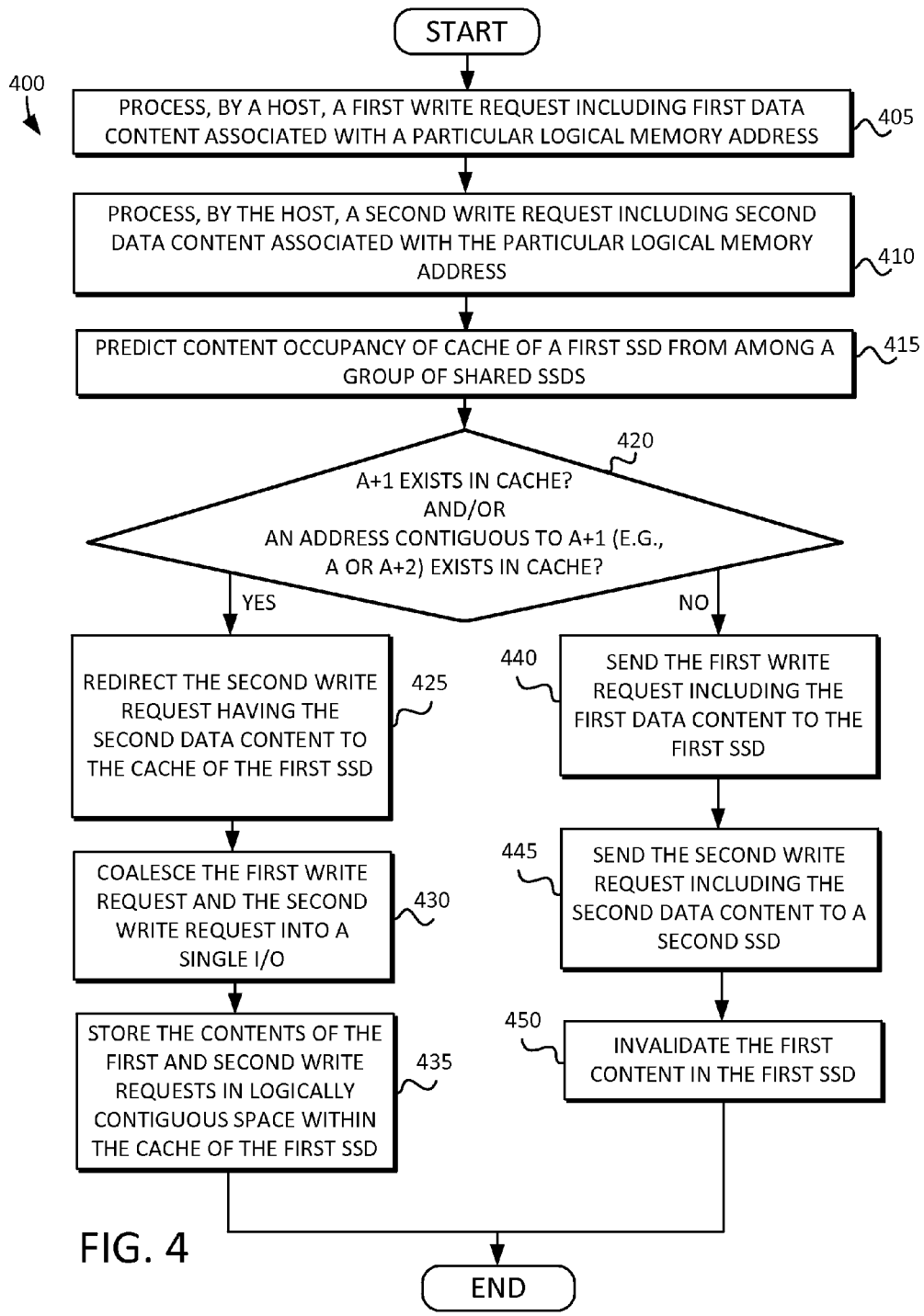
FIG. 4 illustrates a flow diagram including a technique for redirecting IOs to different SSDs in the shared SSD array based on the prediction of memory cache occupancy in an SSD in accordance with embodiments of the inventive concept.

FIG. 4 illustrates a flow diagram 400 including a technique for redirecting I/Os to different SSDs in the shared SSD array based on the prediction of memory cache occupancy in an SSD in accordance with embodiments of the inventive concept. The technique can include a computer-implemented method for predicting solid state drive (SSD) memory cache occupancy and for reducing I/Os in an SSD shared array. For example, the technique can begin at 405 where a first write request (e.g., 230 of FIG. 2) including first data content (e.g., 'C1') associated with a particular logical memory address (e.g., 'A') can be processed, by a host agent (e.g., 105). At 410, a second write request (e.g., 330 of FIG. 3) including second data content (e.g., 'C2') associated with a particular logical memory address (e.g., 'A+1') can be processed, by the host agent (e.g., 105 of FIG. 1). At 415, content occupancy of a cache (e.g., 132 of FIG. 1) of a particular SSD (e.g., 130 of FIG. 1) from among a plurality of shared SSDs (e.g., 125 of FIG. 1) can be predicted. A determination can be made at 420 whether 1) an address (e.g., 'A+1') exists in the cache of a particular SSD and/or 2) whether an address that is contiguous to 'A+1' (e.g., 'A' or 'A+2') exists in the cache of a particular SSD. Determining whether or not an address is probably logically contiguous with another can be based on determining whether a probability exceeds a predefined probability threshold.

If YES, meaning that an either an address in the cache of the particular SSD is probably logically contiguous to the particular memory address (e.g., 'A+1') based on the prediction, or the address (e.g., 'A+1') exists in the cache of a particular SSD, or both, then the flow can proceed to 425, where the second write request (e.g., 330 of FIG. 3) having the second data content (e.g., 'C2') can be redirected, by a re-direction section (e.g., 115 of FIG. 1) of the host agent (e.g., 105 of FIG. 1), to the cache (e.g., 132 of FIG. 1) of the particular SSD (e.g., 130 of FIG. 1) responsive to determining that an address exists in the cache (e.g., 132 of FIG. 1) of the particular SSD (e.g., 130 of FIG. 1) that is probably logically contiguous to the particular logical memory address (e.g., 'A+1').

At 430, the I/O re-direction section (e.g., 115 of FIG. 1) can coalesce the first write request (e.g., 230 of FIG. 2) and the second re-directed write request (e.g., 310 of FIG. 3) into a single I/O (e.g., 340 of FIG. 3). The I/O re-direction section can send the single I/O including the first write request and the second write request to the particular non-volatile memory (e.g., 136 of FIG. 1). The particular SSD 130 can store the first content (e.g., 'C1') of the first write request (e.g., 230 of FIG. 2) at the particular logical memory address (e.g., 'A') of the cache (e.g., 132 of FIG. 1) of the particular SSD (e.g., 130). Also, the particular SSD 130 can store the second content (e.g., 'C2') of the second re-directed write request (e.g., 310 of FIG. 3) at the location (e.g., 325 of FIG. 3) in the cache (e.g., 132 of FIG. 1) of the particular SSD (e.g., 130 of FIG. 1). In other words, the first content C1 and the second content C2 can be stored in logically contiguous space within the cache of the particular SSD.

Otherwise, if NO, meaning that an address in the cache of the particular SSD is probably not logically contiguous to the particular memory address 'A' based on the prediction, the flow can proceed to 440, where the host agent (e.g., 105 of FIG. 1) can send the first write request (e.g., 230) including the first data content (e.g., 'C1') to the particular SSD (e.g., 130 of FIG. 1), after which the host agent (e.g., 105 of FIG. 1) can send, at 445, the second write request (e.g., 330 of FIG. 3) including the second data content (e.g., 'C2') to a second SSD (e.g., 150 of FIG. 1). The host agent (e.g., 105 of FIG. 1) can then cause, at 450, the first content (e.g., 'C1') in the cache (e.g., 132 of FIG. 1) of the particular SSD (e.g., 130 of FIG. 1) to be invalidated. It will be understood that the steps need not occur in the illustrated order, but rather, can occur in a different order and/or with intervening steps.

Figure 5:
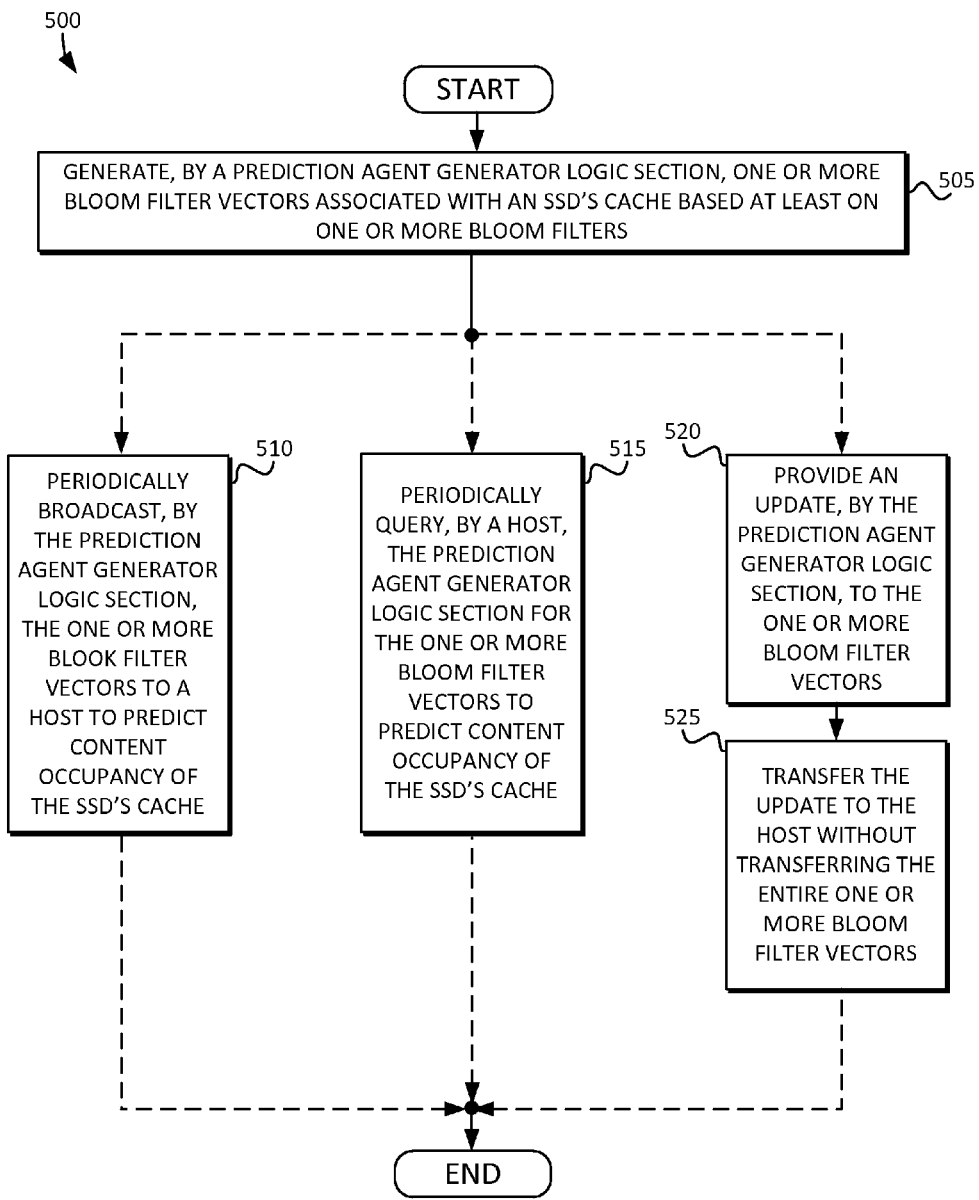
FIG. 5 illustrates a flow diagram including a technique for generating memory cache prediction agents associated with an SSD in accordance with embodiments of the inventive concept.

FIG. 5 illustrates a flow diagram 500 including a technique for generating memory cache prediction agents associated with an SSD in accordance with embodiments of the inventive concept. The technique can begin at 505, where a prediction agent generator logic section (e.g., 134 of FIG. 1) can generate one or more bloom filter vectors (e.g., 210 of FIG. 2) associated with the cache (e.g., 132) of the particular SSD (e.g., 130) based at least on one or more bloom filters (e.g., 205 of FIG. 2). The host agent (e.g., 105 of FIG. 1) can receive the one or more bloom filter vectors (e.g., 210 of FIG. 2). The occupancy prediction logic section (e.g., 110 of FIG. 1) can predict the content occupancy of the cache (e.g., 132 of FIG. 1) of the particular SSD (e.g., 130 of FIG. 1) based at least on the one or more bloom filter vectors (e.g., 210 of FIG. 2).

The flow can proceed along one or more of three paths 510, 515, and 520. For example, at 510, the prediction agent generator logic section (e.g., 134 of FIG. 1) can periodically broadcast the one or more bloom filter vectors (e.g., 210 of FIG. 2) to the host agent (e.g., 105 of FIG. 1). At 515, the host agent (e.g., 105 of FIG. 1) can periodically query the prediction agent generator logic section (e.g., 134 of FIG. 1) for the one or more bloom filter vectors (e.g., 210 of FIG. 2). At 520, the prediction agent generator logic section (e.g., 134 of FIG. 1) can provide an update (e.g., 215 of FIG. 2) to the one or more bloom filter vectors (e.g., 210 of FIG. 2). The prediction agent generator logic section (e.g., 134 of FIG. 1) can transfer the update (e.g., 215 of FIG. 2) to the host agent (e.g., 105 of FIG. 1) without transferring the entirety of the one or more bloom filter vectors (e.g., 210 of FIG. 2), thereby conserving bandwidth. It will be understood that the steps need not occur in the illustrated order, but rather, can occur in a different order and/or with intervening steps.

Figure 6:
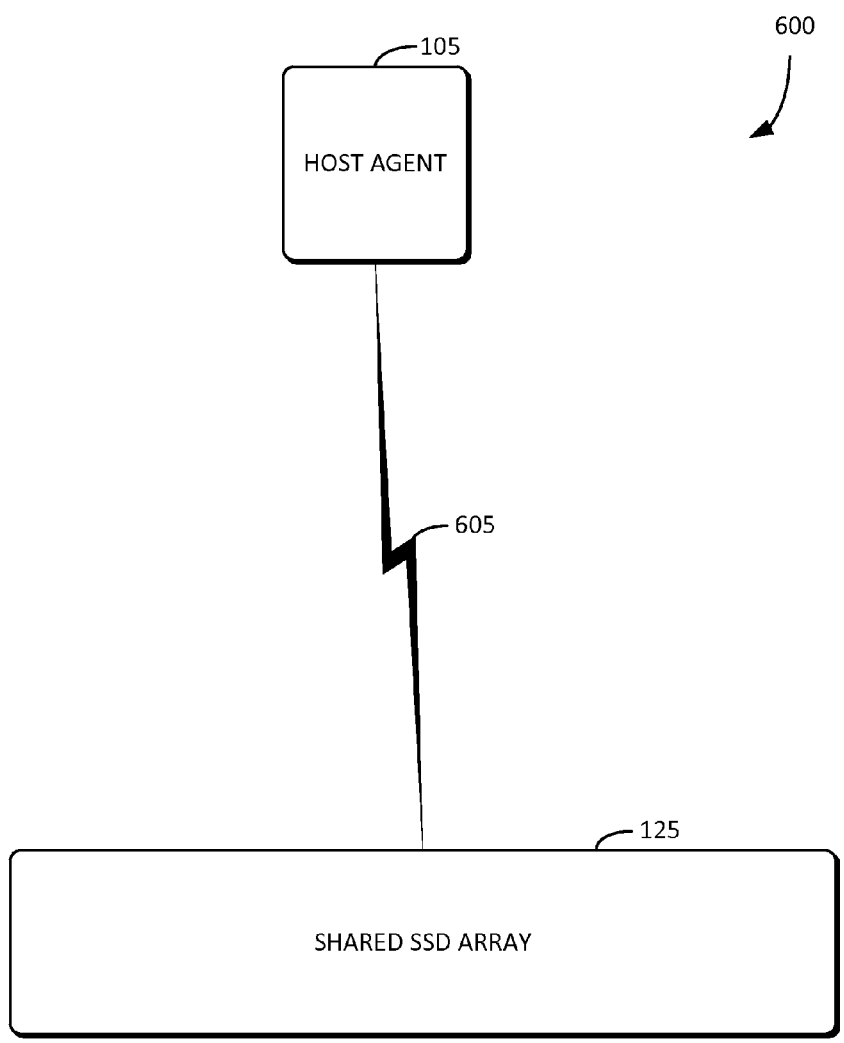
FIG. 6 is another example block diagram of an SSD shared array memory cache system in accordance with embodiments of the inventive concept.

FIG. 6 is another example block diagram of an SSD shared array memory cache system 600 including a host agent 105 and a shared SSD array 125 in accordance with embodiments of the inventive concept. The host agent 105 can correspond to the host agent described in detail above, and therefore, a detailed description is not repeated. The host agent 105 can be in communication with the shared SSD array 125 via the communication means 605.

The communication means 605 can include a processor-to-processor link such as QuickPath Interconnect (QPI). The communication means 605 can include an I/O link such as peripheral component interconnect express (PCIe). The communication means 605 can include a storage link such as serial attached small computer system interface (SAS), an Ethernet link or protocol, a USB interface, a Fibre Channel interface, or the like. The communication means 605 can include a link protocol. The link protocol can be packetized. The link protocol can include a wormhole routing protocol. The host agent 105 can have separate protocol generators, link-layers, and/or controllers. It will be understood that the communication means 605 can include any suitable kind of computer interface and/or link protocol.

Figure 7:
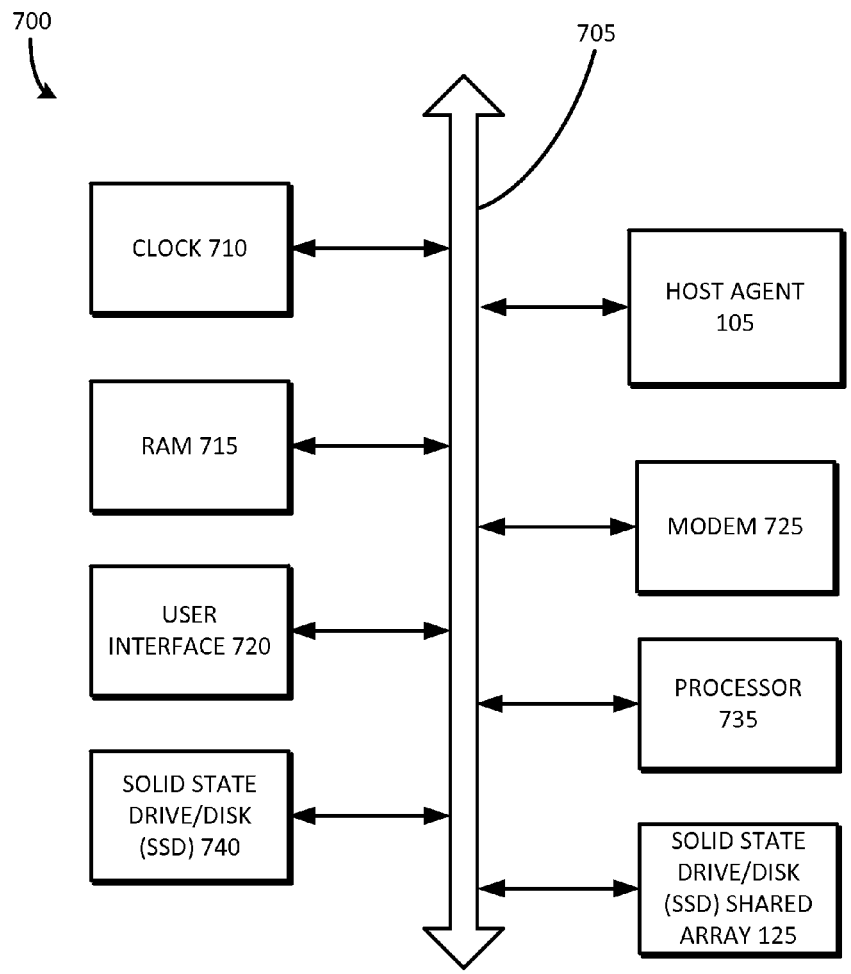
FIG. 7 is a block diagram of a computing system including the host agent and the SSD shared array of FIG. 1.

FIG. 7 is a block diagram of a computing system 700 including the host agent 105 and the SSD shared array 125 of FIG. 1. The computing system 700 can include a clock 710, a random access memory (RAM) 715, a user interface 720, a modem 725 such as a baseband chipset, a solid state drive/disk (SSD) 740, and/or a processor 735, any or all of which may be electrically coupled to a system bus 705. The host agent 105 can correspond to that described in detail above, and as set forth herein, and may also be electrically coupled to the system bus 705. The host agent 705 can include or otherwise interface with the SSD shared array 125, the clock 710, the random access memory (RAM) 715, the user interface 720, the modem 725, the solid state drive/disk (SSD) 740, and/or the processor 735. The SSD shared array 125 can include any set of N SSDs that can be managed together, within the same or different machines, and/or as part of an array. The connection from the host agent 105 to the SSDs 125 can be through an Intel Quickpath Interconnect (QPI) link, a PCIe link, an Ethernet network link, or the like.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A solid state drive (SSD) shared array memory cache system, comprising:
   a plurality of SSD modules each including a non-volatile memory section, a cache, and a prediction agent generator logic section; and
   a host agent communicatively coupled to the plurality of SSD modules, the host agent including an occupancy prediction logic section configured to receive one or more prediction agents from the prediction agent generator logic section of each of the SSD modules, and to predict content occupancy of the cache based at least on the one or more prediction agents, wherein:
   the host agent is configured to process a write request including first data content associated with a particular logical memory address;
   the host agent is configured to send the write request having the first data content associated with the particular logical memory address to a particular one of the SSD modules;
   the particular one of the SSD modules is configured to store the first data content associated with the write request at a location in the cache that is associated with the particular logical memory address;
   the occupancy prediction logic section is configured to predict a presence of an address in the cache that is logically contiguous to the particular logical memory address;
   the write request is referred to as a first write request;
   the host agent is configured to process a second write request having second data content associated with the particular logical memory address; and
   the host agent includes an I/O re-direction section that is configured to re-direct the second write request having the second data content to the cache that has the logically contiguous address that is associated with the particular logical memory address.

2. The solid state drive (SSD) shared array memory cache system of claim 1, wherein:
   the I/O re-direction section is configured to send the redirected second write request having the second data content to the particular one of the SSD modules; and
   the particular one of the SSD modules is configured to store the second data content associated with the redirected second write request to the logically contiguous address in the cache that is associated with the particular logical memory address.

3. The solid state drive (SSD) shared array memory cache system of claim 2, wherein:
   the cache is configured to coalesce the first write request and the redirected second write request into a single I/O, and to send the single I/O to the non-volatile memory section.

4. The solid state drive (SSD) shared array memory cache system of claim 1, wherein:
   the prediction agent generator logic section includes one or more bloom filters and is configured to generate one or more bloom filter vectors based at least on the one or more bloom filters; and
   the one or more bloom filter vectors include the one or more prediction agents.

5. The solid state drive (SSD) shared array memory cache system of claim 4, wherein:
   the prediction agent generator logic section is configured to periodically broadcast the one or more bloom filter vectors including the one or more prediction agents.

6. The solid state drive (SSD) shared array memory cache system of claim 4, wherein:
   the host agent is configured to periodically query the prediction agent generator logic section for the one or more bloom filter vectors including the one or more prediction agents.

7. The solid state drive (SSD) shared array memory cache system of claim 4, wherein:
   the prediction agent generator logic section is configured to provide an update to the one or more bloom filter vectors, and to transfer the update without transferring the entirety of the one or more bloom filter vectors.

8. A computer-implemented method for predicting solid state drive (SSD) memory cache occupancy and for reducing I/Os in an SSD shared array, the method comprising:
   processing, by a host agent, a first write request including first data content associated with a particular logical memory address;
   processing, by the host agent, a second write request including second data content associated with the particular logical memory address;
   predicting content occupancy of a cache of a particular SSD from among a plurality of shared SSDs; and
   determining whether an address in the cache of the particular SSD is logically contiguous to the particular logical memory address based on the prediction;
   generating, by a prediction agent generator logic section, one or more bloom filter vectors associated with the cache of the particular SSD based at least on one or more bloom filters;
   periodically broadcasting, by the prediction agent generator logic section, the one or more bloom filter vectors;
   providing an update, by the prediction agent generator logic section, to the one or more bloom filter vectors; and
   transferring the update to the host agent without transferring the entirety of the one or more bloom filter vectors.

9. The computer-implemented method of claim 8, further comprising:
   periodically querying the prediction agent generator logic section, by the host agent, the one or more bloom filter vectors.

10. The computer-implemented method of claim 8, further comprising:
    receiving, by the host agent, the one or more bloom filter vectors; and
    redirecting, by a re-direction section of the host agent, the second write request having the second data content to the cache of the particular SSD responsive to determining that the address in the cache of the particular SSD is probably logically contiguous to the particular logical memory address,
    wherein predicting the content occupancy of the cache of the particular SSD further includes predicting the content occupancy based at least on the one or more bloom filter vectors.

11. The computer-implemented method of claim 10, further comprising:
coalescing, by the cache, the first write request and the second re-directed write request into a single I/O; and
sending, by the cache, the single I/O including the first write request and the second write request to a non-volatile memory section of the particular SSD.

12. The computer-implemented method of claim 11, further comprising:
storing the first content of the first write request at the particular logical memory address of the cache of the particular SSD; and
storing the second content of the second re-directed write request at the logically contiguous address in the cache of the particular SSD.

13. The computer-implemented method of claim 12, wherein:
the first content and the second content are stored in logically contiguous space within the cache of the particular SSD.

14. A solid state drive (SSD) system, comprising:
an SSD;
a non-volatile memory section;
a cache coupled to the non-volatile memory section; and
a prediction agent generator logic section coupled to the cache and configured to generate one or more prediction agents to predict content occupancy of the cache, and to transfer the one or more prediction agents to a host agent that is separate from the SSD, wherein:
the host agent is configured to process a write request including first data content associated with a particular logical memory address;
the host agent is configured to send the write request having the first data content associated with the particular logical memory address to the SSD;
the SSD is configured to store the first data content associated with the write request at a location in the cache that is associated with the particular logical memory address;
the host agent includes an occupancy prediction logic section;
the occupancy prediction logic section is configured to predict a presence of an address in the cache that is logically contiguous to the particular logical memory address;
the write request is referred to as a first write request;
the host agent is configured to process a second write request having second data content associated with the particular logical memory address; and
the host agent includes an I/O re-direction section that is configured to re-direct the second write request having the second data content to the cache that has the logically contiguous address that is associated with the particular logical memory address.

15. The solid state drive (SSD) system of claim 14, wherein:
the prediction agent generator logic section is configured to include one or more bloom filters, and to generate one or more bloom filter vectors based at least on the one or more bloom filters;
the one or more bloom filter vectors are configured to include the one or more prediction agents; and
the prediction agent generator logic section is configured to periodically broadcast the one or more bloom filter vectors including the one or more prediction agents to the host agent that is separate from the SSD.

* * * * *